United States Patent [19]
Van Veldhuizen

[11] 3,797,400
[45] Mar. 19, 1974

[54] MONORAIL SYSTEM INCLUDING CONVERTIBLE AIR CUSHION VEHICLE PROVIDED WITH VERTICALLY RETRACTABLE WHEELED RUNNING GEAR

[76] Inventor: John Van Veldhuizen, Rt. 1, Estill Springs, Unionville, Tenn. 37330

[22] Filed: Nov. 9, 1972

[21] Appl. No.: 305,113

Related U.S. Application Data

[62] Division of Ser. No. 62,033, Aug. 7, 1970, Pat. No. 3,710,887.

[52] U.S. Cl. .............................. 104/23 FS, 180/116
[51] Int. Cl. .............................................. B61b 13/08
[58] Field of Search ......... 104/23 FS, 134; 180/116, 180/119, 117, 120, 121, 126

[56] References Cited
UNITED STATES PATENTS

| | | | |
|---|---|---|---|
| 3,211,124 | 10/1965 | Mantle | 180/116 |
| 3,173,509 | 3/1965 | Wernicke | 101/23 FS |
| 3,398,713 | 8/1968 | Hall | 180/119 |
| 3,616,760 | 11/1971 | Lucien | 104/23 FS |

Primary Examiner—Gerald M. Forlenza
Assistant Examiner—D. W. Keen
Attorney, Agent, or Firm—Clarence A. O'Brien; Harvey B. Jacobson

[57] ABSTRACT

A monorail system including a monorail structure and a monorail vehicle having powered supporting wheels for rollingly supporting the vehicle from the monorail. In addition, the vehicle is of the air cushion type defining an air cushion chamber therebeneath and the powered wheels of the vehicle also serve as axial flow blowers for supplying the necessary air, after initial forward speed of the monorail vehicle has been obtained, to the air cushion defining chamber beneath the vehicle for supporting the latter by means of an air cushion between opposing surfaces of the monorail structure and the vehicle. Also, the powered supporting wheels which define axial flow blowers are supported from the vehicle for vertical shifting relative thereto, with the front wheels being steerable, whereby the vehicle may be driven at low speeds over a generally horizontal surface in the manner of a conventional motor vehicle.

11 Claims, 7 Drawing Figures

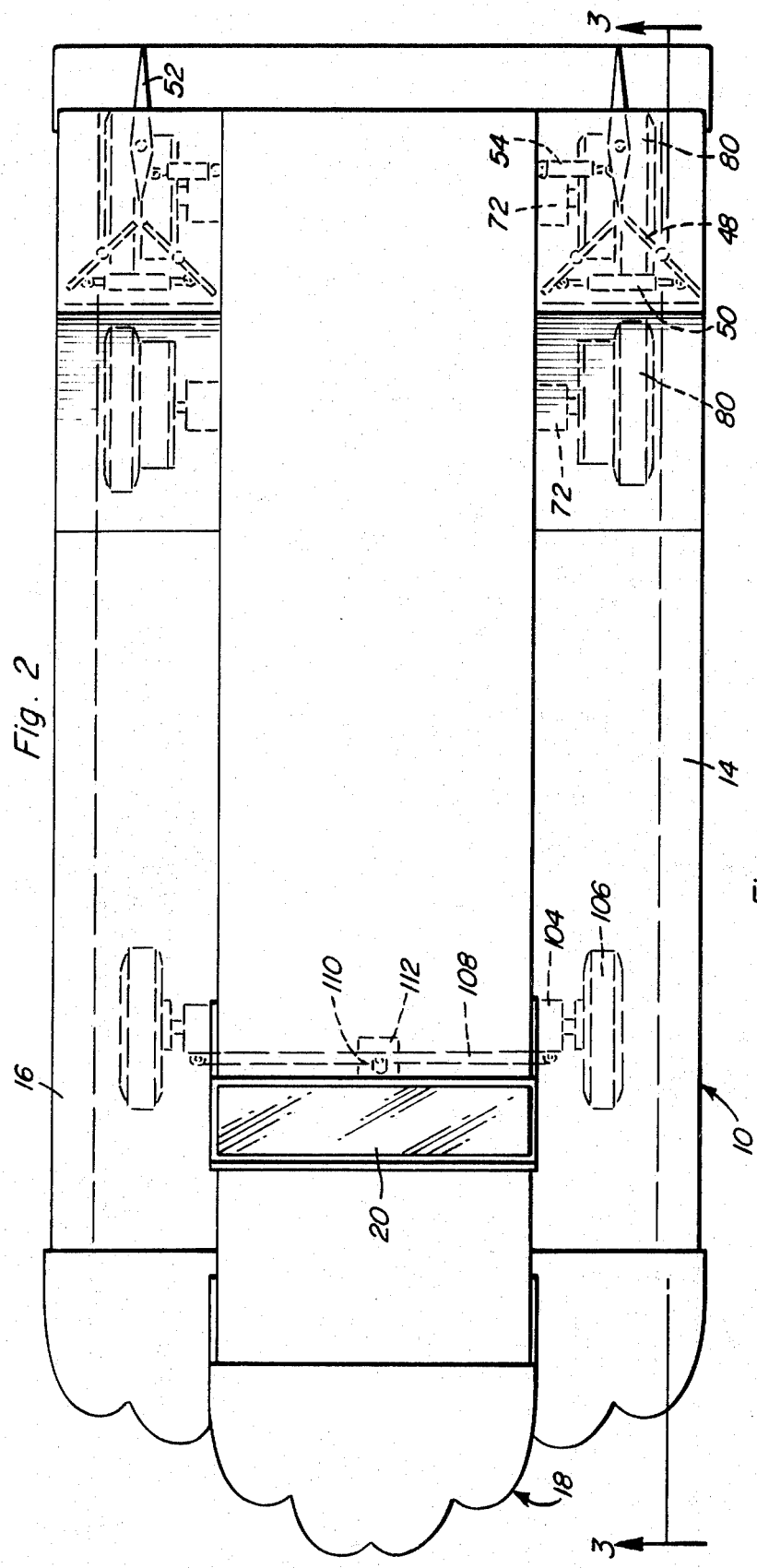
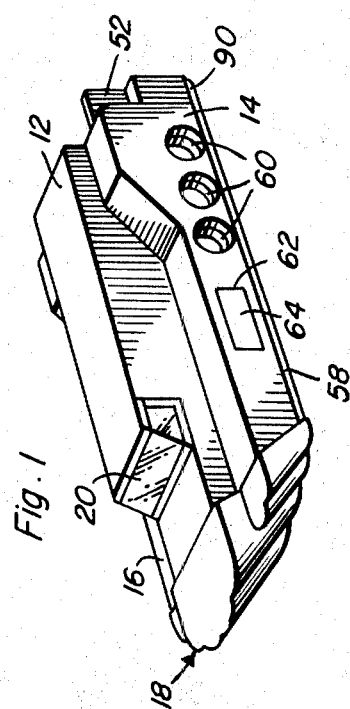

PATENTED MAR 19 1974 3,797,400

MONORAIL SYSTEM INCLUDING CONVERTIBLE AIR CUSHION VEHICLE PROVIDED WITH VERTICALLY RETRACTABLE WHEELED RUNNING GEAR

This application comprises a division of my copending application Ser. No. 62,033, filed Aug. 7, 1970, now Pat. No. 3,710,887.

The air cushion vehicle of the instant invention has been designed for use either on a flat ground surface, on water or on a monorail structure. Either form of the invention illustrated and described hereinafter may be operated so as to be buoyed above its supporting surface by means of an air cushion and the monorail form of the vehicle includes swingable lower opposite side and longitudinally extending skirt portions which may be swung inwardly under opposite side marginal edge portions of a monorail structure in order to key the vehicle to the monorail structure against uncontrolled upward movement relative thereto.

Further, either disclosed form of the invention may or may not include steerable front wheels and provision is provided in each form of the vehicle disclosed for air propulsion of the vehicle when the supporting wheels thereof are raised above the support surface over which the vehicle is supported by an air cushion.

The main object of this invention is to provide a novel air cushion vehicle including blower means which may be rotated at speed in order to form the desired air cushion beneath the body of the vehicle and which may also be utilized as support wheels for the vehicle when the vehicle is traveling at slow speeds.

A further object of this invention, in accordance with the immediately preceding object, is to construct a vehicle including vertically retractable and extendible ground engaging support wheels including steerable front wheels whereby the vehicle may be operated and steered over level ground surfaces.

Yet another object of this invention, in accordance with the immediately preceding object, is to provide a vehicle including pivoted lower opposite side and longitudinally extending skirt portions which are swingable inwardly for disposition beneath opposite side marginal edge portions of a monorail upon which the vehicle is operatively disposed so as to key the vehicle against upward uncontrolled movement relative to the monorail.

Still another object of this invention is to provide the inwardly swingable opposite side skirt portions of the vehicle with roller means operative to rollingly engage the undersurface portions of the opposite sides of an associated monorail structure.

A further object of this invention is to provide an air cushion vehicle including means for forward air propulsion and air braking.

A final object of this invention to be specifically enumerated herein is to provide an air cushion vehicle in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the air cushion vehicle;

FIG. 2 is an enlarged top plan view of the vehicle;

Figure 3:
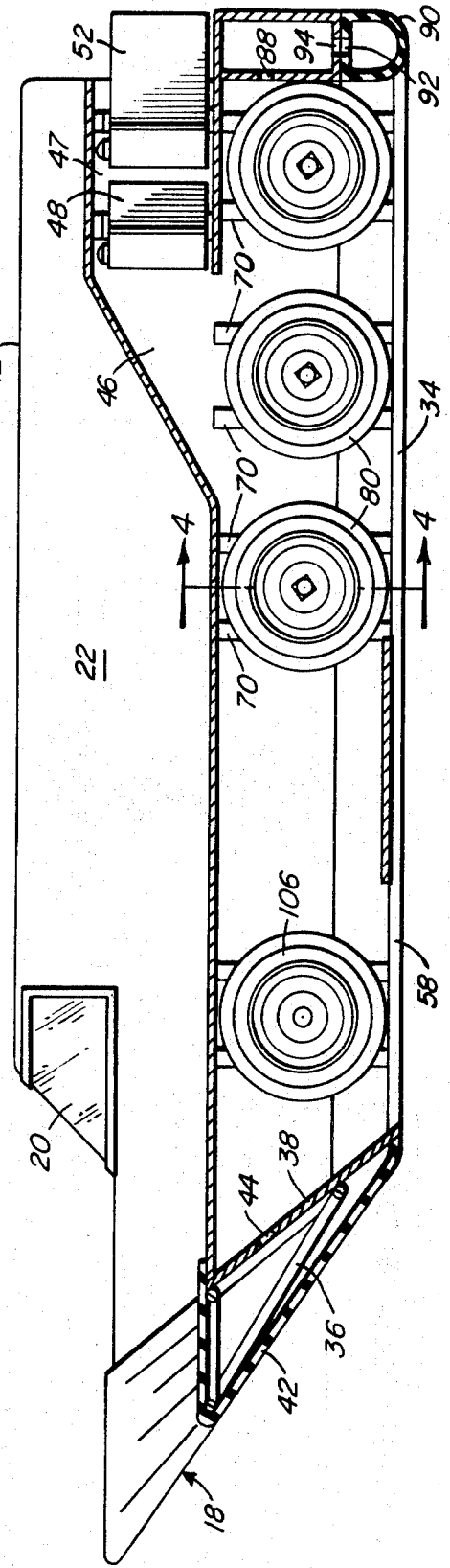
FIG. 3 is a longitudinal vertical sectional view taken substantially upon the plane indicated by the section line 3—3 of FIG. 2.

Referring now more specifically to the drawings, the numeral 10 generally designates the air cushion vehicle of the instant invention. The vehicle 10 includes a central longitudinally extending passenger compartment central body section 12 and a pair of opposite side longitudinally extending side body sections 14 and 16. A resilient bow or forward end structure referred to in general by the reference numeral 18 is carried by the forward end of the vehicle body comprising the sections 12, 14 and 16 and the forward end portion of the central body section 12 includes an operator's cab 20.

Figure 4:
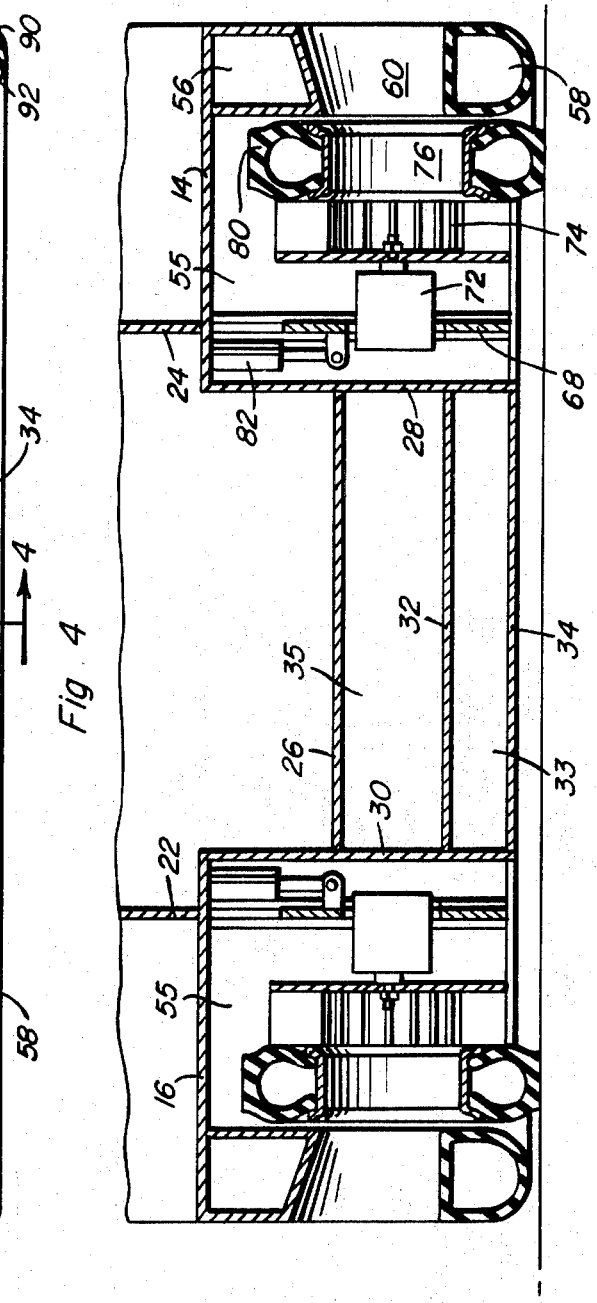
FIG. 4 is a fragmentary enlarged transverse vertical sectional view taken substantially upon the plane indicated by the section line 4—4 of FIG. 3.

From FIG. 4 of the drawings it may be seen that the central body section 12 includes opposite side walls 22 and 24 and that the side body sections 14 and 16 are for the most part disposed outwardly of the side walls 22 and 24. The center body section 12 further includes an inner bottom 26 extending between the inner side wall portions 28 and 30 of the side body sections 14 and 16 and also an intermediate bottom 32 extending between the side wall portions 28 and 30 below the inner bottom 26. Finally, the center body section 12 also includes a lower bottom 34 extending between the side wall portions 28 and 30 below the intermediate bottom 32.

The spacing between the bottoms 32 and 34 defines a closed flotation compartment 33 which may be filled with any suitable form of lightweight flotation material (not shown) and longitudinally spaced portions of the area 35 disposed between the inner bottom 26 and the intermediate bottom 32 may be utilized for storage compartments, although one forwardly disposed portion 35' of the space between the inner bottom 26 and the intermediate bottom 32 opens through both of the side wall portions 28 and 30 so as to communicate the interiors of the side body sections 14 and 16.

The resilient bow section 18 includes a skeleton framework 36 supported from and disposed forwardly of the forwardly and upwardly inclined forward walls 38 of the side body sections 14 and 16. The framework 36 is also supported from and disposed forwardly of a corresponding forwardly and upwardly inclined forward wall 40 of the central body section 12. This framework 36 is covered by a resilient covering 42 and openings 44 are formed in the forward walls 38 thereby communicating the opposite side interior portions of the resilient bow section 18 with the forward ends of the interiors of the side body sections 14 and 16.

The side body sections 14 and 16 each includes hollow upwardly projecting rear end portions 46 defining rearwardly opening air outlets 47 in which pairs of airflow controlling upstanding air shutters 48 interconnected by means of fluid motors 50 are disposed. In addition, each of the rear end portions 46 also includes an upstanding vertical air rudder 52 disposed rearwardly of the corresponding shutters 48 and actuated by means of a fluid motor 54. The shutters 48 and rudders 52 are each oscillated about an upstanding axis and it may therefore be seen that the shutters 48 may be utilized to control the discharge of air from the rear end portions 46 while the rudders 52 may be utilized to laterally deflect the air discharged from the rear end portions 46.

Figure 5:
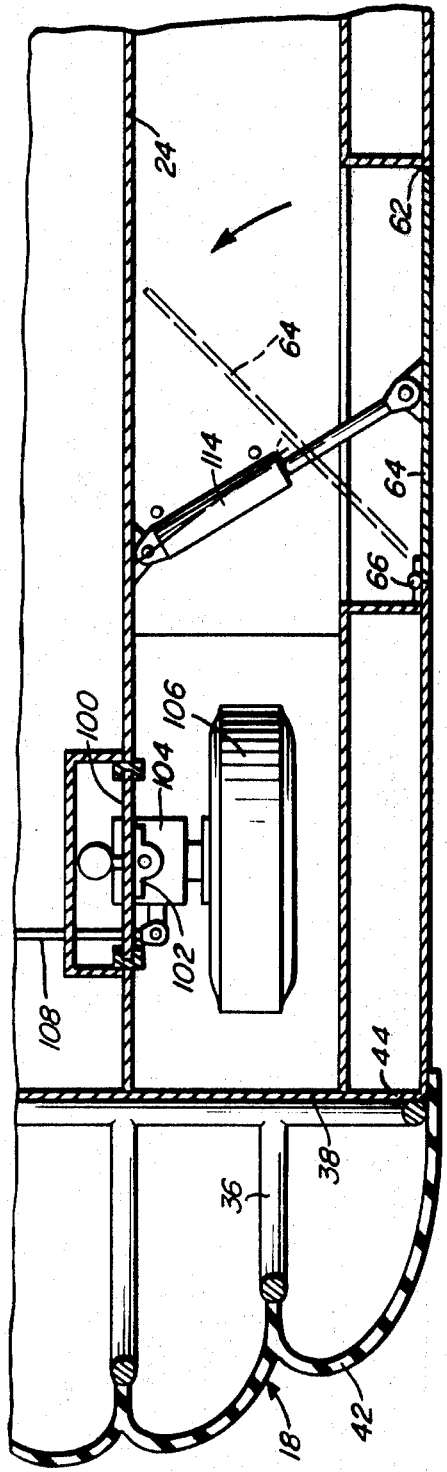
FIG. 5 is a fragmentary enlarged horizontal sectional view of the forward left hand corner portion of the vehicle illustrating the steering controls for the front wheels of the vehicle and the hydraulic motor controls for the side flaps controlling braking air.

The side body sections 14 and 16 define downwardly opening channels or air plenums 55 which extend longitudinally of the opposite sides of the central body section 12. The outer wall portions 56 of the side body sections 14 are hollow and have elongated flexible and inflatable air bladders 58 secured to their lower edge portions. The air bladders 58 project slightly below the lower bottom 34 and the rear end portions of the outer wall portions 56 have three longitudinally spaced openings 60 formed horizontally therethrough and each outer wall portion 56 also has a forward air outlet opening 62 formed therein. The air outlet openings 62 each has a closure flap 64 operatively associated therewith and each closure flap 64 is pivotally secured to the corresponding outer wall portion 56 as at 66 and is shiftable between the closed solid line position illustrated in FIG. 5 of the drawings and the open dotted line position illustrated in FIG. 5.

The lower portions of the side walls 22 and 24 in transverse registry with the openings 60 have support plates 68 supported therefrom by means of upstanding guides 70 and each of the plates 68 supports a suitable motor 72 upon which an axial inlet and radial discharge blower wheel 74 is mounted. In addition, each blower wheel 74 supports a cylindrical wheel rim 76 on its outer end registered with the inner end of the corresponding opening 60 and each wheel rim 76 has a resilient tire 80 mounted thereon.

When the support plates 68 are disposed in their lowermost positions, the tires 80 project below the air bags or bladders 58 and when the support plates 68 are in their uppermost positions, the tires 80 are spaced above the lower extremities of the air bladders 58.

A plurality of fluid motors 82 are operatively connected between the center body section 12 and the support plates 68 and are operable to vertically shift the latter as desired. It will also be noted, see FIG. 4, that the outer axial ends of the wheel rims 76 are closely spaced relative to the inner ends of the openings 60.

The air cushion vehicle 10 further includes a horizontal rear transverse hollow wall portion 86 which is communicated with the rear ends of the hollow outer wall portions 56 by means of air passage openings 88, see FIG. 3. Further, the rear transverse hollow wall portion 86 has a lower air bladder 90 secured to its lower marginal portion and the interior of the air bladder 90 is communicated with the interior of the rear hollow wall portion 86 by means of registered openings 92 formed in the upper wall portion of the hollow bladder 90 and openings 94 formed in the bottom wall portion of the rear transverse hollow wall portion 86.

Figure 6:
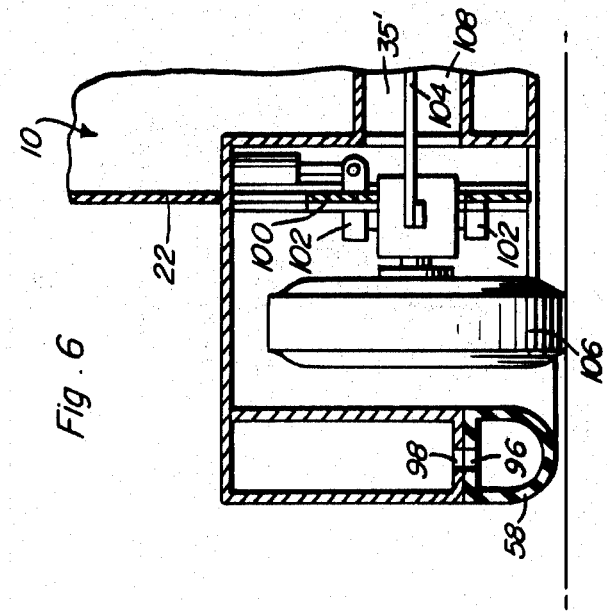
FIG. 6 is a fragmentary transverse vertical sectional view taken substantially upon a plane passing through the left front wheel assembly of the vehicle.

With attention invited now more specifically to FIG. 6 of the drawings it will be noted that the hollow outer wall portion 56 is communicated with the interior of the side air bladders 58 through openings 96 formed in the upper wall portions of the air bladders 58 and openings 98 registered with the openings 96 formed in the lower wall portions of the outer wall portions 56.

A pair of opposite side support plates 100 corresponding to the support plates 68 are supported from the forward end portions of the side walls 22 and 24 and each of these support plates 100 includes a pair of vertically spaced journals 102 from which a motor 104 corresponding to the motor 72 is oscillatably supported. Each of the output shafts of the motors 104 has a ground-engaging wheel 106 mounted thereon and a tie rod 108 extends between the motors 104 for simultaneous and equal oscillation of the latter. Of course, any suitable steering means such as a steering arm 110 supported from a centrally located steering box 112 may be utilized to shift the tie rod 108 whereby the motors 104 will be oscillated.

A fluid motor 114 is operatively connected between each of the side walls 22 and 24 and the corresponding flap 64 whereby the flap 64 may be swung between the open and closed positions.

Figure 7:
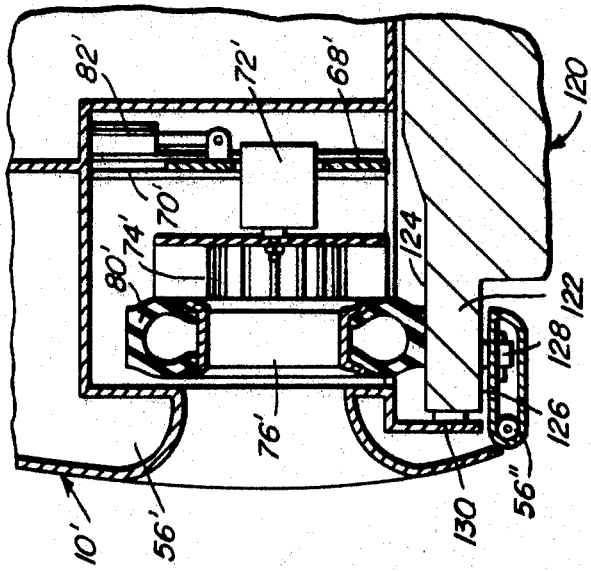
FIG. 7 is a fragmentary transverse vertical sectional view similar to the right hand portion of FIG. 4 but illustrating a modified form of vehicle and its operative association with a monorail structure.

With attention now invited more specifically to FIG. 7 of the drawings there may be seen a modified form of vehicle referred to in general by the reference numeral 10' and which includes many of the structural components of the vehicle 10 and which have therefore been designated by corresponding prime reference numerals.

The vehicle 10' is adapted to be utilized in conjunction with and is therefore illustrated as being supported from a monorail structure referred to in general by the reference numeral 120. The monorail structure 120 includes opposite side longitudinally extending horizontally outwardly projecting flange portions 122 provided with flat upper surfaces 124 and flat lower surfaces 126. The tires 80' of the vehicle 10' are adapted to roll along the upper surface portions 124 when the support plates 68' are lowered and to be retracted above the upper surface portions 124 when the support plates 68' are raised. In addition, the hollow outer wall portions 56' of the vehicle 10' include hinged lower marginal portions 56" which may be swung from retracted upstanding positions to inwardly projecting horizontal positions such as those illustrated in FIG. 7 of the drawings so as to underlie the undersurface portions 126. In addition, the swingable lower marginal portions 56" include rollers 128 for rollingly contacting the undersurfaces 126 and retaining the vehicle 10' in a lowered position with the tires 80' engaged with the upper surface portions 126. Of course, the motors 72' as well as the motors 72 and 104 may be of the reversible type whereby reversing power may be applied for braking. On the other hand, suitable brake assemblies (not shown) may also be carried by each of the motors for braking the associated wheel.

The hollow side wall portions 56' additionally include friction pads 130 for engagement with the outer edge portions of the monorail structure 120 and guiding the movement of the vehicle 10' along the monorail structure 120.

In operation, actuation of the motors 72 and 104 will cause rotation of the corresponding tires 80 and 106 and thus the vehicle 10 to be moved along its supporting surface. However, when the forward speed of the vehicle 10 has been raised sufficiently, the blower wheels 74 are operative to draw air inwardly through the openings 60 and into the plenum chambers defined by the downwardly opening hollow side body sections 14 and 16. The air discharged radially outwardly from the blower wheels 74 is discharged into the air plenums 55 for discharge downwardly and inwardly therefrom in order to form a supporting air cushion beneath the lower bottom 34 and between the air bladders 58.

In this manner, the tires 80 and 106 are elevated slightly above the supporting surface over which the vehicle 10 is disposed and at this point the fluid motors 82 may be actuated to raise the support plates 68 and 100 thereby elevating the tires 80 and 106 appreciably above the supporting surface over which the vehicle 10 is disposed. At this point, the motors 72 and 104 may be appreciably increased in speed whereby sufficient air is pumped into the opposite side body sections 14 and 16 to not only form an air cushion beneath the vehicle 10 but also to provide sufficient rearward discharge of air from the rear end portions 46 to propel the vehicle 10 forwardly independent of tractive engagement of the tires 80 and 106 with the support surface over which the vehicle 10 is disposed. Of course, the shutters 48 may be closed in order to terminate the rearward discharge of propulsion air and the flaps 64 may be opened so as to discharge air forwardly from the hollow opposite side body sections 14 and 16 in order to brake the vehicle 10. Also, the vehicle 10, as hereinbefore set forth, may be provided with brake assemblies operatively associated with the various tires 80 and 106 in order that the tires may be braked when the vehicle 10 drops down into contact with the support surface over which the vehicle 10 is disposed.

Of course, the embodiment of the invention illustrated in FIG. 7 of the drawings is operative in substantially the same manner except that the lower marginal portions 56'' of the outer wall portions 56' may be swung under the opposite side marginal portions of the monorail structure 120 in order to limit upward movement of the vehicle 10 relative to the monorail structure 120 and to prevent the vehicle 10' from leaving the monorail structure 120.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle body including longitudinally extending hollow opposite side sections, each including inner and outer wall portions and having at least one horizontal opening formed in its outer wall portion, said hollow side sections defining longitudinally extending air plenums, said body including depending peripheral skirt portions defining a central downwardly opening chamber beneath said body and into which the lower portions of said plenums open, said body including driven axial intake rotary blower wheels mounted within said air plenums in registry with the inner ends of said openings and operative to draw ambient air into said air plenums from the exterior of said side sections through said openings for subsequent discharge into said chamber, whereby to form a vehicle body supporting air cushion in said chamber, supports mounted within said side walls for vertical shiftng between upper and lower limit positions and from which said blower wheels are journaled, said blower wheels including outer peripheral load supporting tread portions spaced above the lower extremities of said side skirt portions in both their upper and lower limit positions.

2. The combination of claim 1 wherein said side skirt portions include lower marginal portions supported for inward swinging movement, and a monorail structure including an upper horizontal flange portion upon which said vehicle body is supported and inwardly beneath whose opposite side marginal portions said lower marginal portions are swingable, to lock said body to said rail against uncontrolled upward movement relative thereto.

3. The combination of claim 2 wherein said lower marginal portions include roller means for rolling engagement with the under surfaces of said flange marginal edge portions when said lower marginal portions are swung inwardly beneath said rail side marginal portions.

4. The combination of claim 1 wherein said air plenums include one set of corresponding end portions which open endwise outwardly of the corre-sponding end of said body for air propulsion of said body in the direction in which the other end faces.

5. A vehicle body including depending peripheral skirt portions defining an air cushion cavity therebetween beneath said body, powered ground engageable support wheels journaled from opposite sides of aid body and defining axial flow blowers whose innermost axial ends open into said cavity, the depending peripheral skirt portions carried by said opposite sides of said body having horizontal transverse openings formed therethrough whose inner axial ends are registered with the outermost axial ends of said blowers, the lower peripheral portions of said wheels projecting at least slightly below the lower marginal portions of said peripheral skirt portions.

6. The combination of claim 5 wherein said body includes rearwardly opening air discharge means communicated with the interior of said cavity and means for throttling the rearward discharge of air from said cavity.

7. A vehicle body including depending peripheral skirt portions defining an air cushion cavity therebetween beneath said body, powered ground engageable support wheels journalled from opposite sides of said body and defining axial flow blowers whose innermost axial ends open into said cavity, and means supporting said support wheels from said body for vertical shifting relative thereto, said means supporting said support wheels for vertical shifting including means for shifting said support wheels between upper and lower limit positions with the lower peripheral portions of said support wheels spaced above and below, respectively, the lower marginal portions of said peripheral skirt portions.

8. The combination of claim 7 wherein at least some of said support wheels are supported from said body for oscillation about upstanding axes.

9. The combination of claim 8 wherein said body includes rearwardly opening air discharge means communicated with the interior of said cavity and means for throttling the rearward discharge of air from said cavity, and also means operative to adjustably horizontally deflect air discharged past said throttling means.

10. The combination of claim 9 wherein forward portions of the opposite sides of said vehicle include oppositely and horizontally outwardly opening discharge openings communicated with the interior of said air cushion cavity, and air discharge valves operatively associated with said openings for variably controlling the discharge of air from said cavity through said discharge openings.

11. In combination, an elongated monorail, a vehicle body disposed on said monorail and including depending opposite side portions defining a centrally downwardly opening chamber therebetween beneath said body, said vehicle being disposed on said monorail with at least the upper portion of said monorail received in said chamber, said body including selectively drivable axial intake rotary blower wheels mounted within opposite side portions of said body above said monorail and communicating with said central chamber at their inner ends, said blower wheels being provided with outer peripheral load supporting tread portions and being supported from said vehicle for adjustable vertical shifting relative thereto between lower portions rollingly supporting said vehicle from said monorail and upper positions raised upwardly out of contact with said monorail when said vehicle is resting upon said monorail, said blower wheels being operative, when driven at high speed, to pump sufficient ambient air into said chamber whereby to form a vehicle body supporting air cushion in said chamber above said monorail.

* * * * *